Aug. 5, 1924.
W. E. MARTIN
1,503,796
SIDE DELIVERY RAKE AND SWATH TURNER
Filed June 19, 1923    2 Sheets-Sheet 1
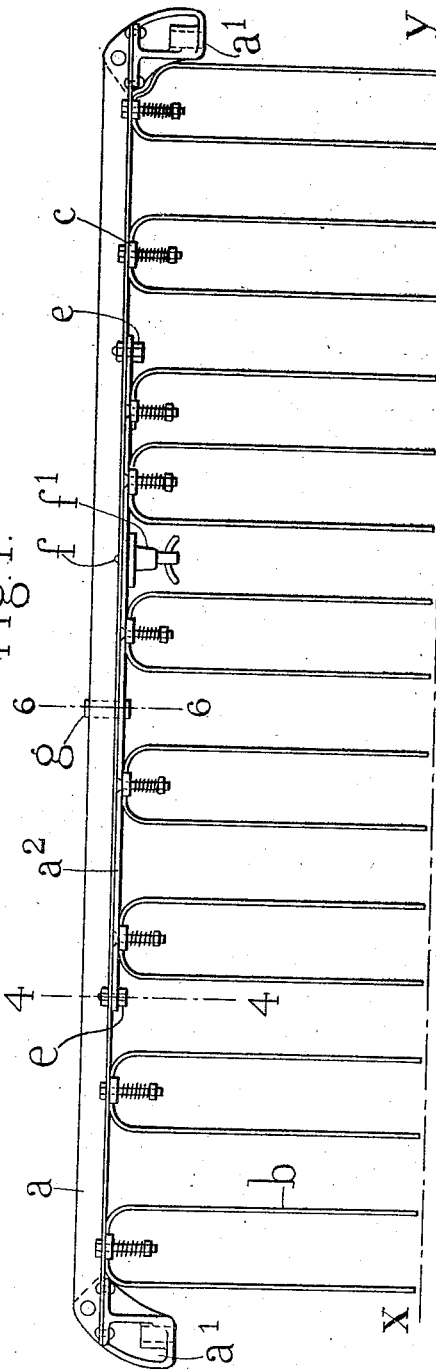
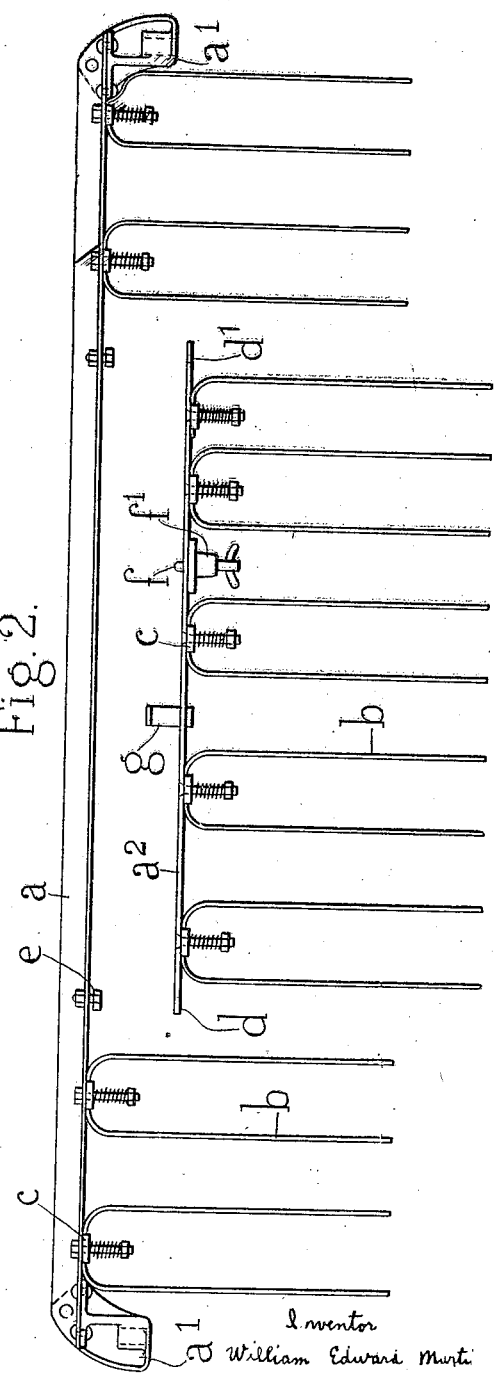

Aug. 5, 1924.
W. E. MARTIN
1,503,796
SIDE DELIVERY RAKE AND SWATH TURNER
Filed June 19, 1923  2 Sheets-Sheet 2
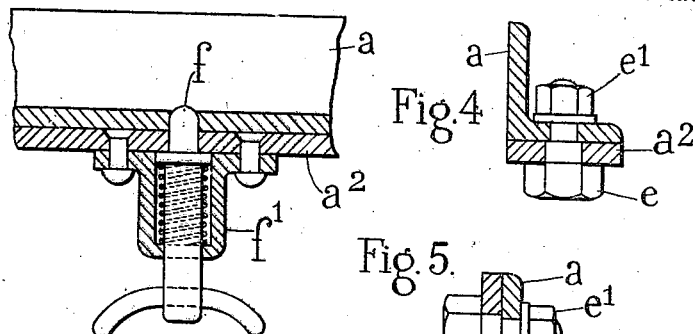
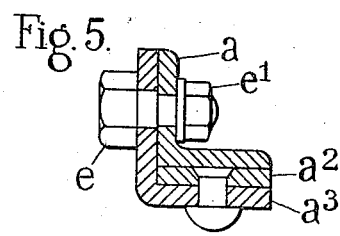
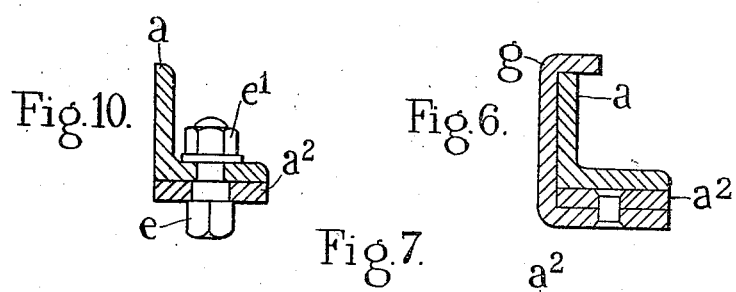
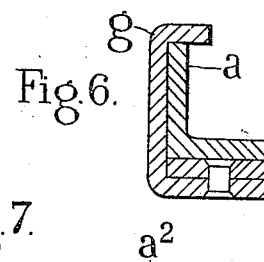
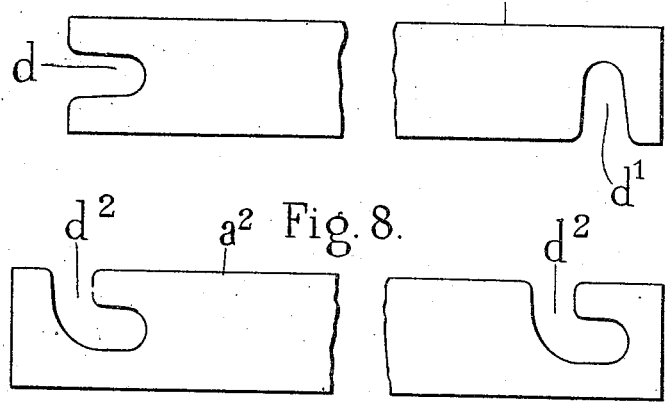
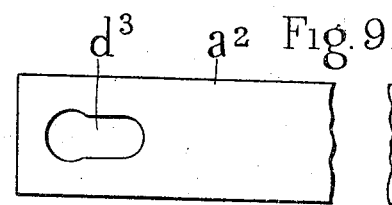

Patented Aug. 5, 1924.

1,503,796

UNITED STATES PATENT OFFICE.

WILLIAM EDWARD MARTIN, OF SCOTGATE, STAMFORD, ENGLAND.

SIDE-DELIVERY RAKE AND SWATH TURNER.

Application filed June 19, 1923. Serial No. 646,302.

*To all whom it may concern:*

Be it known that I, WILLIAM EDWARD MARTIN, a subject of the King of Great Britain, residing at Rock House, Scotgate, Stamford, in the county of Lincoln, England, have invented a new and useful Improvement in Side-Delivery Rakes and Swath Turners, of which the following is a specification.

The invention relates to that type of rake in which the main rake head is raised above the end bearings and carries at its centre a detachable rake which may be removed to form a gap between end rakes for the purpose of turning over two swaths simultaneously and keeping them separated.

With such rake heads it has been customary hitherto to fix the tops of the tines at a certain distance below the angle iron or other bar of which the main rake head is formed.

According to the present invention I lengthen all the tines and fix those forming the centre rake at their tops to a bar which is fixed directly to and throughout its length in contact with the main rake head. The end rakes are permanently fixed to the main rake head and the centre rake is detachably fixed thereto.

The head of the centre rake may be formed with slots such as longitudinal and transverse open ended slots, bayonet slots, and key hole slots which slots according to one construction fit over headed projections on the under side of the main rake head. These slots prevent motion between the main rake head and the head of the detachable rake in some directions, but in order to fix the head of the detachable rake in all directions it is provided with a spring bolt which enters and fits an aperture in the main rake head.

In a modified construction the headed projections may extend horizontally from the main rake head and the slots may be suitably arranged in the head of the detachable rake.

The tines are preferably flat strips of metal bent into U-form or what may be termed half U-form and are connected in any convenient manner at their tops to the underside of a flat bar or to the horizontal portion of an angle bar. The vertical portions of the tines are arranged in planes at right angles to the rake head.

The invention is illustrated in the accompanying drawings in which Figure 1 is an elevation of a complete rake head and Figure 2 is an elevation showing the detachable central rake removed. Figure 3 is a longitudinal sectional elevation through the spring box showing the spring locking bolt in its locking position. Figure 4 is a section on the line 4—4 of Figure 1. Figure 5 is a transverse section through the rake head showing an alternative arrangement with the headed pin horizontal. Figure 6 is a section on line 6—6 of Figure 1. Figure 7 shows longitudinal and transverse slots in the head of the detachable rake. Figure 8 shows bayonet ended slots in the head of the detachable rake. Figure 9 shows key hole slots in the head of the detachable rake. Figure 10 is a transverse section through the rake head showing a modified construction to that shown in Figure 4.

The main rake head is straight and consists of an angle bar $a$ which is raised above the end bearings (not shown) by means of upwardly extending castings $a^1$ of known construction. The tines $b$ are lengthened so that they will extend from the horizontal portion of the angle bar $a$ into close proximity to the ground, indicated by the broken line $x$—$y$ in Figure 1, when the rake is in its lowest position. The tines $b$ at each end are shown connected directly to the horizontal part of the angle bar $a$ and the centre tines $b$ are attached to the detachable bar $a^2$. The tines $b$ may be connected to the bars $a$ and $a^2$ in any known manner, but in the drawings they are shown connected by spring clips $c$ which form no part of the present invention.

The bar $a^2$ is formed with the longitudinal and transverse open ended slots $d$ $d^1$ as shown more clearly in Figure 7, which slots fit over headed projections $e$ fixed to the bar $a$. The projections $e$, as shown clearly in Figures 4 and 10, each consists of a headed bolt having a shoulder which fits against the underside of the bar $a$ and is secured by a nut $e^1$. The bar $a^2$ is also provided with a spring bolt $f$, the construction of which is seen clearly in Figure 3. When the head $a^2$ of the detachable rake is slid into position in close contact throughout its length with the rake head $a$ and with its slots $d$ $d^1$ passing over the headed projections $e$, the spring bolt $f$, which has been withdrawn within its housing $f^1$, is released and its end then enters an aperture in the horizontal portion of the bar $a$. The bar $a^2$ forming the head of the centre rake, is preferably provided with a hanger $g$, the upper horizontal member of which passes over the top of the main rake head $a$ and prevents the bar $a^2$ sagging at its centre.

Instead of employing slots such as $d$ $d^1$, the bar $a^2$ may be provided with L-shaped or bayonet slots $d^2$ as shown in Figure 8 or it may be provided with key hole shaped slots $d^3$ as shown in Figure 9. In this latter case the circular portions of the key hole shaped slots must be sufficiently large to pass over the head of the projection and a suitable projection $e$ to pass through the slots $d^3$ is shown in Figure 10.

If desired, the headed projections $e$ may be arranged in the vertical portion of the bar $a$ as shown in Figure 5 in which case the bar $a^2$ of the detachable rake will be provided with an angle iron $a^3$ the vertical portion of which is provided with suitable slots such as $d$ $d^1$ $d^2$ $d^3$ to pass over the headed projections $e$. In this modification the bar $a^2$ and angle bar $a^3$ are in close contact throughout their lengths with the rake head $a$. The tines $b$ are preferably flat metal strips bent into U-forms. Some of the tines may be bent into half U-form and one tine of this latter form is shown at the right-hand end of the detachable centre rake in Figures 1 and 2. The vertical portions of the tines are arranged in planes at right angles to the rake head. These tines form no part of the present invention.

What I claim as my invention is:—

1. An improved rake for side delivery rakes and swath turners having in combination upwardly extending end castings, a main rake head extending in a straight line horizontally between and located at the upper part of said castings, tines permanently and directly fixed to each end of the main rake head, a detachable bar carrying tines and means for fixing the detachable bar directly to the main rake head, and in contact with the same throughout its length all the tines extending from the horizontal part of the main rake head into close proximity to the ground, substantially as set forth.

2. An improved rake for side delivery rakes and swath turners having in combination upwardly extending end castings, a main rake head extending in a straight line horizontally between and located at the upper part of said end castings, tines permanently and directly fixed to each end of the main rake head, a detachable and slotted bar carrying tines, a spring bolt carried by said detachable and slotted bar adapted to enter an aperture in the main rake head and headed projections fixed in the main rake head over which projections fits the detachable and slotted bar in contact with the said rake head throughout its length, all the tines extending from the horizontal part of the main rake head into close proximity to the ground, substantially as set forth.

3. An improved rake for side delivery rakes and swath turners having in combination upwardly extending end castings, a main rake head extending in a straight line horizontally between and located at the upper part of said end castings, tines permanently and directly fixed to each end of the main rake head, a detachable and slotted bar carrying tines, a spring bolt carried by said detachable and slotted bar adapted to enter an aperture in the main rake head, a hanger fixed to said detachable and slotted bar the upper horizontal part of which passes over the main rake head and headed projections fixed in the main rake head over which projections fits the detachable and slotted bar in contact with the main rake head throughout its length, all the tines extending from the horizontal part of the main rake head into close proximity to the ground, substantially as set forth.

4. An improved rake head for side delivery rakes and swath turners having in combination upwardly extending end castings, a main rake head extending in a straight line horizontally between and located at the upper part of said end castings, tines permanently and directly fixed to each end of the main rake head, a detachable bar carrying tines, an angle iron fixed to said detachable bar having slots in the vertical portion thereof, a spring bolt carried by said detachable bar and entering an aperture in the main rake head and headed projections fixed horizontally in the main rake head over which projections fit the slots in the angle iron fixed to the detachable bar; the angle iron and detachable bar being throughout their lengths in close contact with the main rake head and all the tines extending from the main rake head into close proximity to the ground substantially as set forth.

In witness whereof I have hereunto set my hand.

WILLIAM EDWARD MARTIN.